US008941669B1

(12) United States Patent
Moreton

(10) Patent No.: US 8,941,669 B1
(45) Date of Patent: Jan. 27, 2015

(54) SPLIT PUSH BUFFER RENDERING FOR SCALABILITY

(75) Inventor: Henry P. Moreton, Woodside, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1845 days.

(21) Appl. No.: 11/830,741

(22) Filed: Jul. 30, 2007

(51) Int. Cl.
*G06F 15/16* (2006.01)
*G06F 15/80* (2006.01)

(52) U.S. Cl.
USPC ............................ 345/503; 345/502; 345/505

(58) Field of Classification Search
CPC ... G06F 9/461; G06F 9/505; G09G 2360/125; G06T 15/005
USPC ........... 345/501–503, 505, 542; 718/105, 108
See application file for complete search history.

(56) References Cited

U.S. PATENT DOCUMENTS

| 6,359,624 B1 * | 3/2002 | Kunimatsu ..................... 345/503 |
| 6,956,579 B1 * | 10/2005 | Diard et al. .................... 345/537 |
| 6,985,152 B2 * | 1/2006 | Rubinstein et al. ........... 345/520 |
| 7,015,915 B1 * | 3/2006 | Diard ............................. 345/522 |
| 7,348,986 B2 * | 3/2008 | Doyle et al. ................... 345/502 |
| 7,755,632 B2 * | 7/2010 | Brothers et al. ............... 345/520 |
| 2007/0013702 A1 * | 1/2007 | Hiroi et al. ..................... 345/502 |

* cited by examiner

*Primary Examiner* — Joni Richer
(74) *Attorney, Agent, or Firm* — Kilpatrick Townsend & Stockton LLP

(57) ABSTRACT

Frames are rendered by multiple graphics processors (GPUs), which may be heterogeneous. Graphics processors split the execution of the command in a push buffer of a frame. One GPU begins rendering a frame, and a second GPU takes over rendering that frame after the second GPU is done rendering a previous frame. The second GPU may then begin rendering a subsequent frame.

20 Claims, 10 Drawing Sheets

SPLIT PUSH BUFFER RENDERING FOR SCALABILITY

CROSS-REFERENCES TO RELATED APPLICATIONS

The present disclosure is related to the following commonly-assigned co-pending U.S. patent applications:
application Ser. No. 11/303,565, filed Dec. 16, 2005, entitled "Multiprocessor Computing Systems With Heterogeneous Processors";
application Ser. No. 11/264,828, filed Oct. 31, 2005, entitled "Multichip Rendering with State Control";
application Ser. No. 11/253,438, filed Oct. 18, 2005, entitled "Zero Frame Buffer";
The respective disclosures of these applications are incorporated herein by reference for all purposes.

BACKGROUND

The present invention relates generally to computer systems with multiple graphics processors and in particular to the efficient rendering of frames using the multiple graphics processors.

The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene.

As the demand for computer graphics, and in particular for real-time computer graphics, has increased, computer systems with graphics processors adapted to accelerate the rendering process have become widespread. In these computer systems, the rendering process is divided between a computer's general purpose central processing unit (CPU) and a graphics processing units (GPU). Typically, the CPU performs high level operations, such as determining the position, motion, and collision of objects in a given scene. From these high level operations, the CPU generates a set of rendering commands and data defining the desired rendered image or images. For example, rendering commands and data can define scene geometry, lighting, shading, texturing, motion, and/or camera parameters for a scene. The graphics processor creates one or more rendered images from the set of rendering commands and data.

To maximize rendering performance, the computer system may include two or more graphics processing units (GPUs) operating in parallel. The graphics processing units can distribute the rendering workload in a number of different ways. For example, different portions of an image can be rendered in parallel by different GPUs. The portions are then combined to produce a complete rendered image. In another example parallel rendering scheme, each GPU renders one image in a sequence of images.

Typically, if a computer system includes two or more GPUs, the GPUs running on a computer system are required have equivalent performance. One reason is that the usual methods for distributing the rendering workload work best when the GPUs are equivalent. However, for cost and availability reasons, a user may desire to implement two GPUs that are non-equivalent or heterogeneous in terms of performance. For instance, a user may want to use both an integrated GPU already present on a motherboard and a discrete GPU present on a separate board.

Therefore it is desirable to provide systems, methods, and apparatus for efficient distribution of the rendering workload when using heterogeneous GPUs.

SUMMARY

Embodiments of the present invention are directed to rendering of multiple frames by multiple GPUs, which may differ from one another. In one aspect, two GPUs split the execution of the commands to render a frame. A slower GPU begins rendering a frame, and a faster GPU takes over rendering that frame when the faster one is done rendering a previous frame. The slower GPU may then begin rendering a subsequent frame. A command buffer may hold the commands for a single frame or hold the commands for multiple frames.

One exemplary embodiment of the present invention provides a method of rendering a plurality of frames with a plurality of graphics processors configured to operate in parallel. A command buffer including commands for rendering a plurality of current frames is provided. For each current frame, there exist commands for a previous frame and a subsequent frame. Different sections or portions of the commands for rendering a specific current frame may be written by different central processors.

For each current frame, a first graphics processor executes a first portion of the commands for rendering the current frame. Also, an execution of the commands for the current frame is switched from the first graphics processor to a second graphics processor based on the second graphics processor completing a rendering of a frame previous the current frame. While the second graphics processor completes the rendering of the current frame, the first graphics processor executes a first portion of the commands for rendering a frame subsequent to the current frame.

In one embodiment, the first graphics processor is an integrated graphics processor and the second graphics processor is a discrete graphics processor. In one aspect, these two graphics processors are heterogeneous to each other and operate to produce identical results upon executing identical commands. In yet another embodiment, the second graphics processor executes all of the commands for the previous buffer of a first current frame.

In another embodiment, the rendered current frames are stored in a memory. The memory may be a system memory of a computer system that includes the first and second graphics processors, a memory that is connected to the first or second graphics processor, or any other memory of the computer system. In yet another embodiment, prior to the second graphics processor completing the rendering of the previous frame, the first graphics processor changes from executing the first portion of the commands for the current frame to executing the first portion of the commands for a subsequent frame.

In one embodiment, the command buffer is created in part by storing different instances of complete state data at a plurality of locations within the commands of each current frame. The second graphics processor may then read the instance of complete state data that is stored before where the first graphics processor stopped executing the commands of the current frame. In one aspect, the different instances of complete state data are stored at periodic locations within the command buffer.

In another embodiment, the current frames are alternate frames of a video stream. Other current frames may be rendered by other graphics processors. These other current frames can be different alternate frames of a video stream. In one aspect, the method provides another command buffer for these other current frames. For each of these other current frames, a third graphics processor executes a first portion of the commands for rendering the other current frame. The execution of the commands for the other current frame switches from the first graphics processor to a fourth graphics processor based on the fourth graphics processor completing the rendering of a previous other frame. The third graphics processor may then execute a first portion of the commands for rendering a subsequent other frame while the fourth graphics processor completes rendering the current other frame.

Another exemplary embodiment of the present invention provides a method of rendering a plurality of frames with a plurality of graphics processors configured to operate in parallel. A first command buffer including commands for rendering a first frame and a second command buffer including commands for rendering a second frame are provided. The first graphics processor executes a first portion of the first command buffer. Upon determining an availability of a second graphics processor, the first graphics processor stops execution of the first command buffer. The first graphics processor then executes a first portion of the second command buffer. While the first graphics processor executes the first portion of the second command buffer, the second graphics processor executes a remaining portion of the first command buffer.

In one embodiment, determining the availability of the second graphics processor is based on when the second graphics processor completes executing commands for a command buffer for a frame previous to the first frame. In another embodiment, determining the availability of the second graphics processor is based on a pre-indication signal that determines that the second graphics processor will be available soon. Determining an availability of the second graphics processor may include communicating the availability from the second graphics processor to the first graphics processor.

In another embodiment, a third command buffer including commands for rendering a third frame is provided. Upon determining another availability of the second graphics processor, the first graphics processor stops execution of the second command buffer. The first graphics processor may then execute a first portion of the third command buffer. While the first graphics processor executes the first portion of the third command buffer, the second graphics processor executes a remaining portion of the second command buffer.

Another exemplary embodiment of the present invention provides a computer program product having a computer readable medium encoded with program code for controlling operation of a computer system to render a plurality of frames with a plurality of graphics processors configured to operate in parallel.

The following detailed description together with the accompanying drawings will provide a better understanding of the nature and advantages of the present invention.

DESCRIPTION OF EXEMPLARY EMBODIMENTS

Embodiments of the present invention provide for the rendering of multiple frames by multiple GPUs, which GPUs may be heterogeneous. In one aspect, two GPUs split the execution of the commands for rendering a frame. A slower GPU begins rendering a frame, and a faster GPU takes over rendering that frame when the faster one is done rendering a previous frame. The slower GPU may then begin rendering a subsequent frame. In another aspect, more GPUs may be employed, as described herein.

I. System Overview

Figure 1:
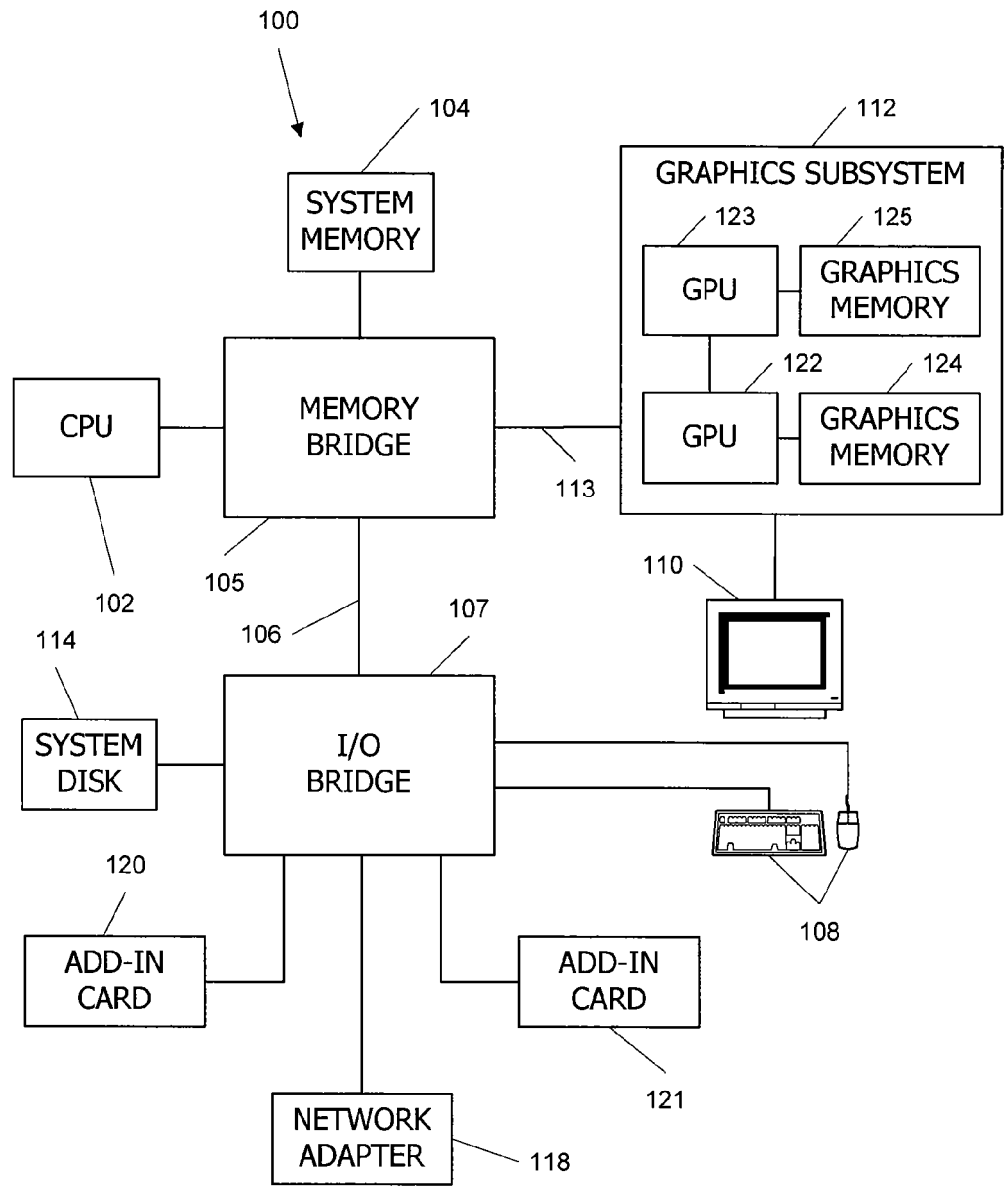
FIG. 1 is a block diagram of a computer system that is improved by incorporating an embodiment of the present invention.

FIG. 1 is a block diagram of a computer system 100 that is improved by incorporating an embodiment of the present invention. Computer system 100 includes a central processing unit (CPU) 102 and a system memory 104 communicating via a bus path that includes a memory bridge 105. Memory bridge 105, which may be, e.g., a conventional Northbridge chip, is connected via a bus or other communication path 106 (e.g., a HyperTransport link) to an I/O (input/output) bridge 107.

I/O bridge 107, which may be, e.g., a conventional Southbridge chip, receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus or other communication path 113, e.g., a PCI Express (PCI-E) or Accelerated Graphics Port (AGP) link. A system disk 114 is also connected to I/O bridge 107. A switch may provide connections between I/O bridge 107 and other components such as a network adapter 118 and various add-in cards 120, 121.

Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI-E, AGP, HyperTransport, or any other bus or point-to-point communication protocol(s), and connections between different devices may use different protocols as is known in the art.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported.

Graphics processing subsystem 112 includes at least two graphics processing units (GPUs) 122, 123. GPU 122 has an associated graphics memory 124, and GPU 123 has an associated graphics memory 125. GPUs 122, 123 and graphics memories 124, 125 may be implemented, e.g., using one or more integrated circuit devices such as programmable processors, application specific integrated circuits (ASICs), and memory devices. In some embodiments, GPUs 122, 123 and graphics memories 124, 125 are implemented in one or more expansion cards or other adapters that can be inserted into and removed from expansion slots (e.g., PCI-E slots) in system 100. Additional GPUs (not shown in FIG. 1) may also be included.

Each of GPUs 122, 123 may be configured to perform various tasks related to generating pixel data (also referred to herein as "pixels") from graphics data supplied by CPU 102 and/or system memory 104 via memory bridge 105 and bus 113, interacting with a respective graphics memories 124, 125 to store and update pixel data, and the like. For example, GPUs 122, 123 may generate pixel data from 2-D or 3-D scene data provided by various programs executing on CPU 102. GPUs 122, 123 may also store pixel data received via memory bridge 105 to respective graphics memories 124, 125 with or without further processing. Each of GPUs 122, 123 may also include a scanout module (also referred to herein as a display pipeline) that can be configured to deliver pixel data from respective graphics memories 124, 125 to an output port of the GPUs 122, 123. The output port might be connected to a monitor or to another GPU.

Each GPU may be provided with any amount of local graphics memory, including no local memory, and may use local memory and system memory in any combination. For instance, in a unified memory architecture (UMA) embodiment, no dedicated graphics memory device is provided, and some or all of the GPUs may use system memory exclusively or almost exclusively. In UMA embodiments, a GPU may be integrated into a bus bridge chip or provided as a discrete chip with a high-speed bus (e.g., PCI-E) connecting the GPU to the bridge chip and system memory.

Interconnection between the GPUs may also be modified. For instance, a bridge unit might be provided to interconnect GPUs. A bridge unit, which can be in a separate chip or integrated with one of the GPUs, receives incoming data from system bus 106 and distributes it appropriately (e.g., to all GPUs or to those GPUs identified by a sub-device mask). Another bridge unit might be provided to manage selection among candidate pixels during scanout.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

GPUs 122, 123 may be controlled in the following manner. CPU 102 operates as the master processor of system 100, controlling and coordinating operations of other system components. In particular, CPU 102 issues commands that control the operation of GPUs 122 and 123. In some embodiments, CPU 102 writes a stream of commands for GPUs 122, 123 to a command buffer, which may be in system memory 104, graphics memories 124 and/125, or another storage location accessible to both CPU 102 and GPUs 122, 123. The commands may include conventional rendering commands for generating images as well as general-purpose computation commands that enable applications executing on CPU 102 to leverage the computational power of GPUs 122, 123 for data processing that may be unrelated to image generation.

II. The Command Buffer

Figure 2:
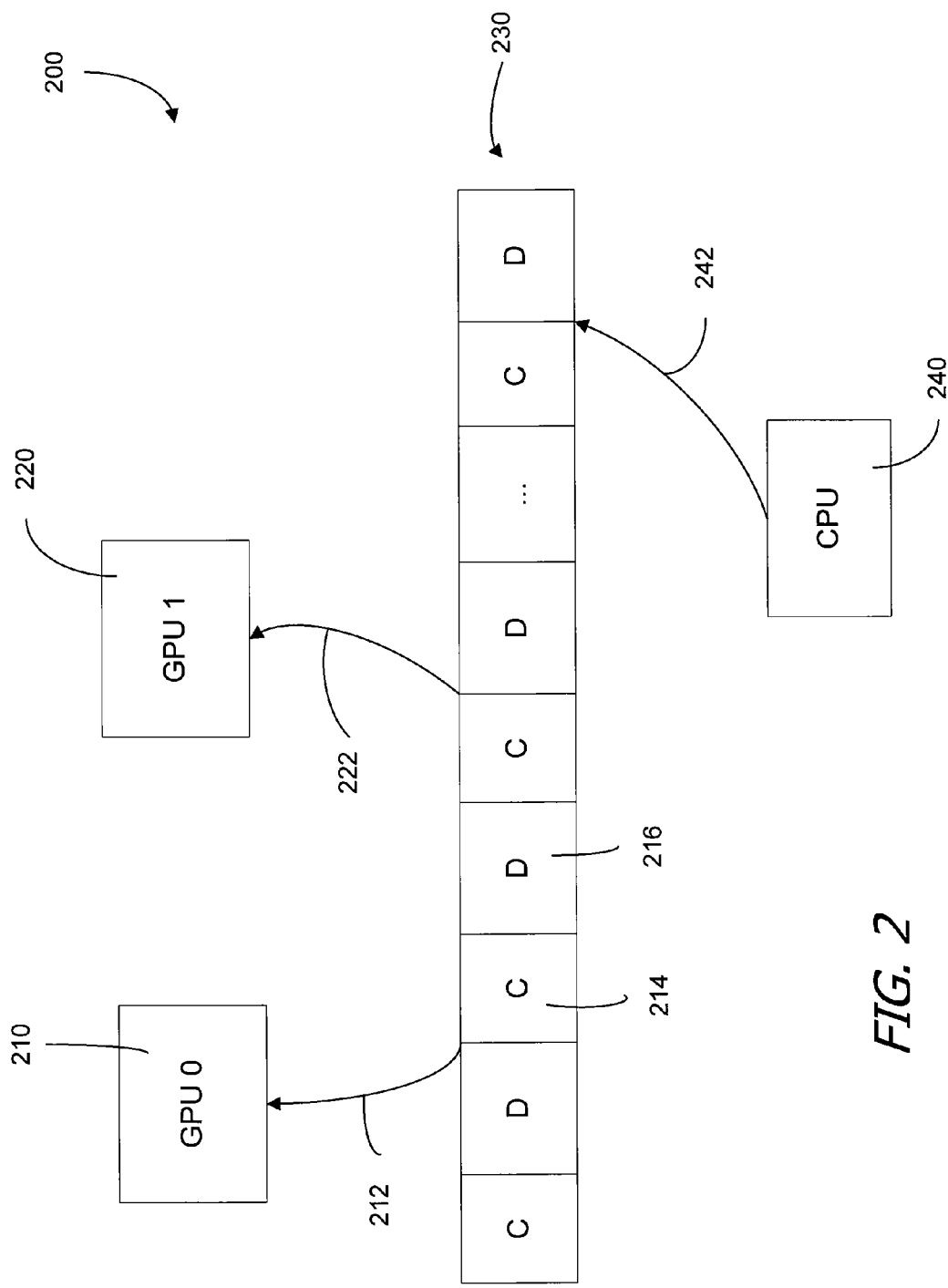
FIG. 2 illustrates a system for communicating rendering commands from a central processing unit (CPU) to multiple graphics processing units (GPUs) according to an embodiment of the present invention.

FIG. 2 illustrates a system 200 for communicating rendering commands from a central processing unit (CPU) 240 to two graphics processing units (GPUs) 210 and 220 that may be improved by incorporating an embodiment of the present invention. In this embodiment, the CPU 240 and GPUs 210 and 220 communicate asynchronously through a command buffer 230. Command buffer 230 is stored in memory accessible to both the CPU 240 and the GPUs 210 and 220. In an embodiment, the command buffer 230 is stored in the computer system's general memory, such as the system memory 104 in FIG. 1, and is accessible to the GPUs 210 and 220 via direct memory access (DMA) transfers. In this example, one command buffer is shown for simplicity, though each GPU may access a separate command buffer in other embodiments of the present invention. The command buffer 230 may also be referred to as a push buffer.

Command buffer 230 stores sets of rendering commands, such as rendering command 214, and sets of rendering data, such as rendering data 216. In one embodiment, a rendering command is associated with rendering data. The rendering command defines the set of rendering processes to be performed by a GPU on an associated rendering data. In a further embodiment, the rendering data is stored in the command buffer 230 adjacent to the corresponding rendering command.

The CPU 240 writes rendering commands and data sets to the command buffer 230. The command buffer 230 can include a number of rendering commands and data sets. The CPU 240 writes commands and data sets into the command buffer 230 at the location determined by "put" pointer 242. Following each CPU 240 write into the command buffer 230, the CPU 240 increments the put pointer 242 to the next unused location in the command buffer 230. In an embodiment, a driver software program executed by the CPU 240 translates high-level rendering commands from a rendering application into commands and data sets, which are then written into the command buffer 230. In a further embodiment, the driver software program receives high-level rendering commands via an application programming interface, for example DirectX™ or OpenGL™.

The GPUs 210 and 220 read commands and data sets from the command buffer 230 at a location determined by "get" pointers 212 and 222. Following each GPU read from the command buffer 230, the GPUs 210 and 220 increment the get pointers 212 and 222 to the location of the next command or data set in the command buffer 230. In one embodiment, each GPU has a separate get pointer which is incremented. In other embodiments, this pointer is shared, and only one GPU increments the get counter following a GPU read.

The CPU 240 and GPUs 210 and 220 can access the command buffer independently. In an embodiment, the CPU 240 periodically adds new commands and data sets to the command buffer 230. In embodiments with more than one CPU, each CPU may add new commands and data sets to the command buffer 230. Simultaneously, the GPUs 210 and 220 read processes commands and data sets previously stored by the CPU 240. Provided the CPU 240 stays ahead of the GPUs 210 and 220, the GPUs 210 and 220 are able to render images without waiting for the CPU 240. In an embodiment, the CPU 240 writes commands and data sets for frames that are several frames ahead of the frame being rendered by the GPUs 210 and 220, e.g. 2 or 3 frames ahead.

In an embodiment of the present invention, the command buffer is limited in size. As an example, a typical command buffer may be five megabytes in size. When either the get pointers 212 and 222 or put pointer 242 reaches the end of the command buffer 230, the pointer is reset to the location of the beginning of the command buffer 230. In this manner, the command buffer 230 "wraps around," enabling the CPU 240 and GPUs 210 and 220 to access the command buffer 230 in a continuous loop.

In order to make full use of both GPUs 210 and 220, it may be desirable that each GPU render a unique set of geometries. The less overlap there is in their rendering workload, the higher the efficiency of each GPU. Accordingly, each GPU 210 and 220 may receive a unique set of geometries and corresponding rendering commands.

But this division of rendering commands has limited practicality and requires a great deal of overhead complexity to achieve. Some rendering commands contain information that is needed by all the GPUs in a system. For example, a rendering command may contain state information regarding a change in the point of view (referred to as camera position), current color or texture, current shader program, or the like. If these updates are not received by each GPU, the image will be incorrect. For example, if a change in camera position is not received by each GPU, the point of view for images or image portions rendered by different GPUs will vary, leading to unfortunate results. Accordingly, an embodiment of the present invention provides for a shared command buffer. Some embodiments provide for rendering commands to be received by each GPU in a system, while eliminating or reducing unneeded or redundant rendering and 3-D pipeline tasks.

Where GPUs 122, 123 are communicably coupled to each other, distributed rendering in various forms can be supported. For example, in split-frame rendering (SFR), GPU 122 can render a top portion of an image while GPU 123 renders a bottom portion of the same image. In alternate frame rendering (AFR), GPU 122 can render a first frame in an image sequence while GPU 123 renders a second frame, and so on. In Z-first distributed rendering, GPU 122 can populate a Z buffer and deliver the Z buffer data to GPU 123, which uses the Z buffer data provided by GPU 122 to determine which primitives to process in a fragment shader. Combinations of the above distributed rendering may also be used. The distribution of the commands to the GPUs differs depending on the form of distributed rendering used.

III. The Command Buffer in SFR and AFR

In the split-frame rendering mode, multiple GPUs operate in parallel to render different portions of an image for a display device. Each GPU renders pixel data for a different portion of the displayable image, such as a number of lines of a raster-based display. The image portions may correspond to horizontal bands, vertical bands, or other divisions as desired. Horizontal bands are usually chosen. The image is displayed by reading out the pixel data from each GPU's display buffer in an appropriate sequence.

To generate a displayable image consisting of M rows of pixel data, the first GPU can be instructed to render rows 1 through P, while the second GPU is instructed to render rows P+1 through M. Often, to preserve internal consistency of the displayed image ("frame coherence"), each GPU is prevented from rendering a subsequent frame until the other GPU has also finished the current frame so that both portions of the displayed image are updated in the same scanout pass.

Figure 3A:
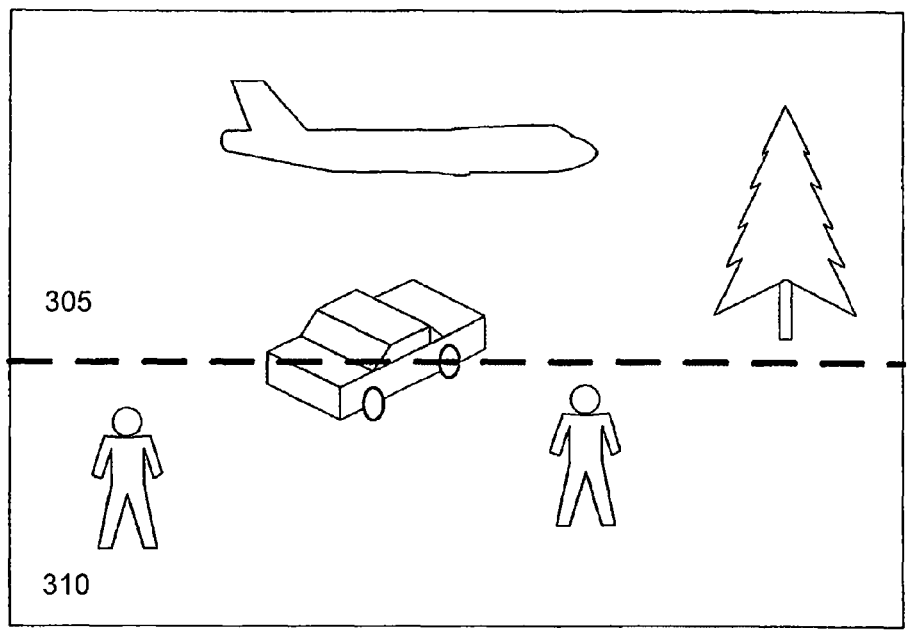
FIG. 3A illustrates an example image to be rendered by two GPUs operating in parallel that may be improved by incorporating an embodiment of the present invention.

FIG. 3A illustrates an example image 300 to be rendered by two GPUs operating in parallel whose rendering may be improved by incorporating an embodiment of the present invention. Image 300 is rendered by splitting the image into different portions, with each portion rendered by at least one GPU. In this example, image portion 305 is rendered by a first GPU and image portion 310 is rendered by a second GPU.

In general, split-frame parallel rendering schemes such as that illustrated by FIG. 3A require GPUs to be programmed with a combination of common rendering commands, which are executed by all of the GPUs of the system, and specific rendering commands, which are executed by a subset of the GPUs of the system. In the example of FIG. 3A, both GPUs are programmed with common rendering commands necessary to render all of the geometry and shading of the scene. The GPUs are then programmed with separate rendering commands to define clipping windows corresponding to image portions 305 and 310.

Figure 3B:
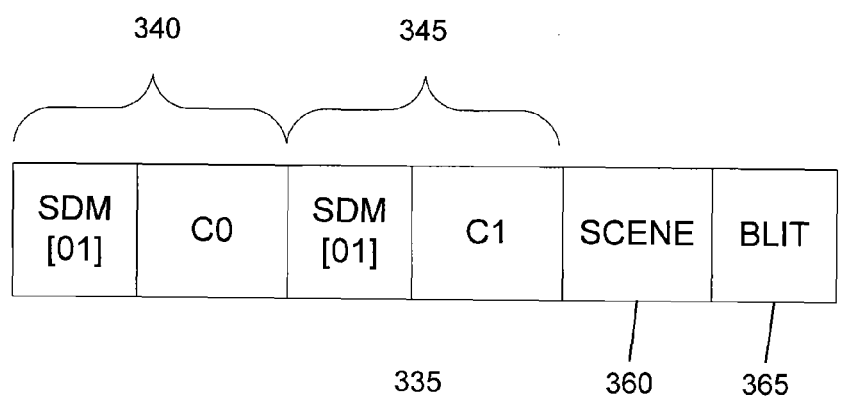
FIG. 3B illustrates an example command buffer that programs two GPUs and a coprocessor to render portions of an image in parallel.

FIG. 3B illustrates an example command buffer 335 that programs two GPUs, e.g., GPUs 210, 220, and a coprocessor, e.g., CPU 240, to render portions of an image in parallel. Command set 340 includes an Set Device Mask (SDM) command designating GPU 210. Command set 340 further includes one or more commands specific to GPU 210. In an embodiment, command set 340 includes a command setting the clip region for GPU 210 to the portion of the screen to be rendered by this GPU. Command set 345 includes an SDM command disabling GPU 210 and enabling GPU 220. Similar to command set 340, command set 345 includes a command for setting the clip region for GPU 220 to the portion of the screen to be rendered by GPU 220.

Following the programming of GPU-specific commands using commands sets 340 and 345, an SDM command with a device mask of "11" is used to enable simultaneous programming of all of the GPUs. Common rendering commands 360 for rendering the scene are executed by all of the GPUs. Following the rendering of the separate portions of the output image, an embodiment of the invention assembles these portions into a complete output image. Blit commands 365 may be used to copy the portions rendered by GPU 220 to the display memory of GPU 210. When more GPUs are involved, blit commands 365 may include a set of SDM commands to selectively program the other GPUs with different copy commands as each image portion is copied to a different location in the display memory of GPU 210. GPU 210 may then output the assembled image to a display device. In blitless versions, partial buffers are scanned out be each individual GPU and are combined by the GPU actually attached to the display.

Ideally, the display area (or screen) is partitioned in such a way that each GPU requires an equal amount of time to render its portion (clipping window) of the image. If the rendering times are unequal, a GPU that finishes its portion of the frame first will be idle, wasting valuable computational resources. For example, in a typical scene from a video game, the foreground characters and/or vehicles—which are often complex objects rendered from a large number of primitives—tend to appear near the bottom of the image, while the top portion of the image is often occupied by a relatively static background that can be rendered from relatively few primitives and texture maps. When such an image is split into top and bottom halves, the GPU that renders the top half will generally complete its portion of the image, then wait for the other GPU to finish. To avoid this idle time, the display area may be divided unequally, with the top portion being larger than the bottom portion. In general, the optimal division depends on the particular scene being rendered and may vary over time even within a single video game or other graphics application.

Load balancing may be performed by determining whether one of two graphics processors finishes rendering a frame last more often than the other. If one of the processors finishes last more often, a portion of the processing burden (e.g., a number of lines of pixels to render) is shifted from that processor to the other processor. The comparison can be repeated and the load adjusted as often as desired.

The load balancing typically assumes that the GPUs are homogeneous (i.e. the same type of processor) by partitioning the image equally. Additionally, the load balancing method works best when the GPUs are homogeneous as both GPUS will then react the same to rendering complicated objects. Load balancing may also be done by distributing whole frames to different GPUs via alternate frame rendering (AFR). There are techniques where one GPU might render two frames in a row while the other works on a third; however, this creates issues of buffering up too many frames and latency of response issues.

Figure 4A:
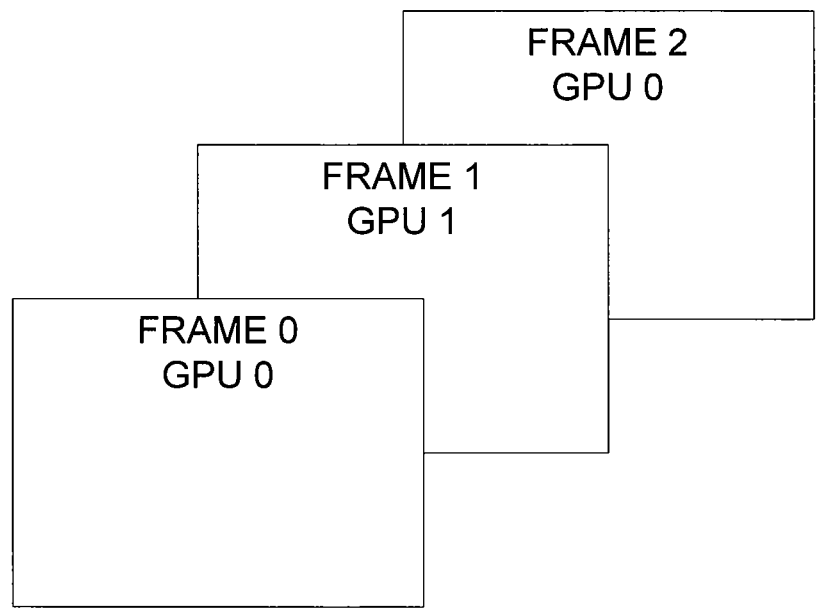
FIG. 4A illustrates an implementation of alternate frame rendering (AFR) using two GPUs that may be improved by incorporating an embodiment of the present invention.

FIG. 4A illustrates an implementation of alternate frame rendering (AFR) for parallel rendering using, for example, two GPUs whose rending may be improved by incorporating an embodiment of the present invention. An initial frame (Frame 0) is rendered by a GPU 0. The next frame (Frame 1) is rendered by a GPU 1. After rendering Frame 0, GPU 0 begins to render Frame 2. After rendering Frame 1, GPU 1 will begin to render the next frame after Frame 2. Thus, the different GPUs render the frames in sequence, and consecutive frames are rendered in parallel. A synchronization of the GPUs ensures that the frames come out in the proper order. Thus, one GPU may have to stop and wait while another GPU catches up.

Figure 4B:
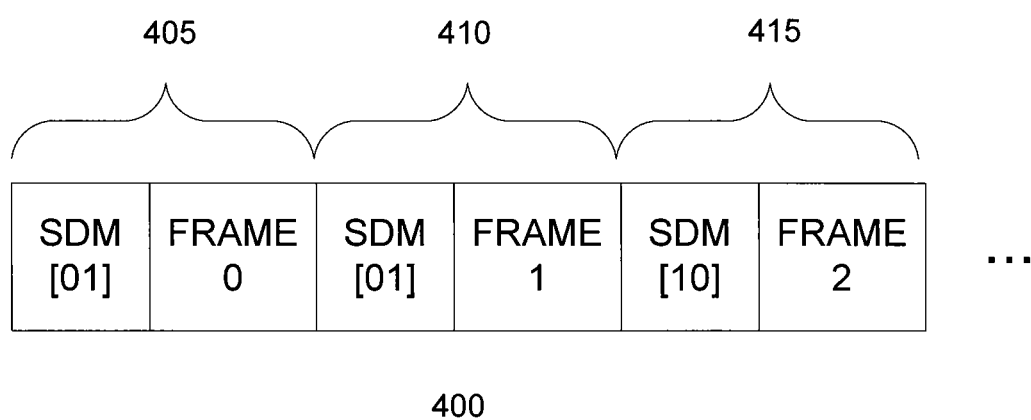
FIG. 4B illustrates an example command buffer that programs two GPUs for an alternate frame rendering scheme that simultaneously renders different frames.

FIG. 4B illustrates an example command buffer 400 that programs two GPUs for an alternate frame rendering scheme that simultaneously renders different frames. Command buffer 400 includes rendering command set 405, which designates GPU 0 to render commands for frame 0. Rendering command set 405 is followed by rendering command set 410, which designates GPU 1 to render commands for frame 1. The first and second GPUs will render frames 0 and 1 simultaneously.

Following rendering command set 410, rendering command set 415 programs the GPU 0 to render frame 2. This pattern of programming is repeated for all subsequent frames. In an alternate embodiment, rendering command set 415 programs a third GPU to render frame 2. In this embodiment, frame 2 is rendered simultaneously with frames 0 and 1. This embodiment can be extended to accommodate any number of GPUs. The frames are usually divided equally among the GPUs, which are typically homogeneous. However, problems may arise when heterogeneous GPUs are used.

IV. Heterogeneous GPUs

In accordance with embodiments of the present invention, GPUs 122 and 123 may be "heterogeneous," meaning that their designs may be different in at least some respects. In one embodiment, GPUs 122 and 123 are advantageously operable in a "compatible mode," in which they process the same commands and produce identical results regardless of any design differences that may exist, as described in U.S. patent application Ser. No. 11/303,565, which is incorporated herein by reference. The compatible mode may be used to support distributed rendering. Heterogeneous GPUs may particularly occur when one GPU is integrated (IGPU) onto a motherboard, and the other GPU resides in on an add-on card as a discrete graphics processor (DGPU). However, heterogeneous GPUs may also occur when different GPUs reside on different add-on cards, each as discrete graphics processors (DGPUs). Heterogeneous often will have different processing capabilities, which may be measured in triangles per second.

Figure 5:
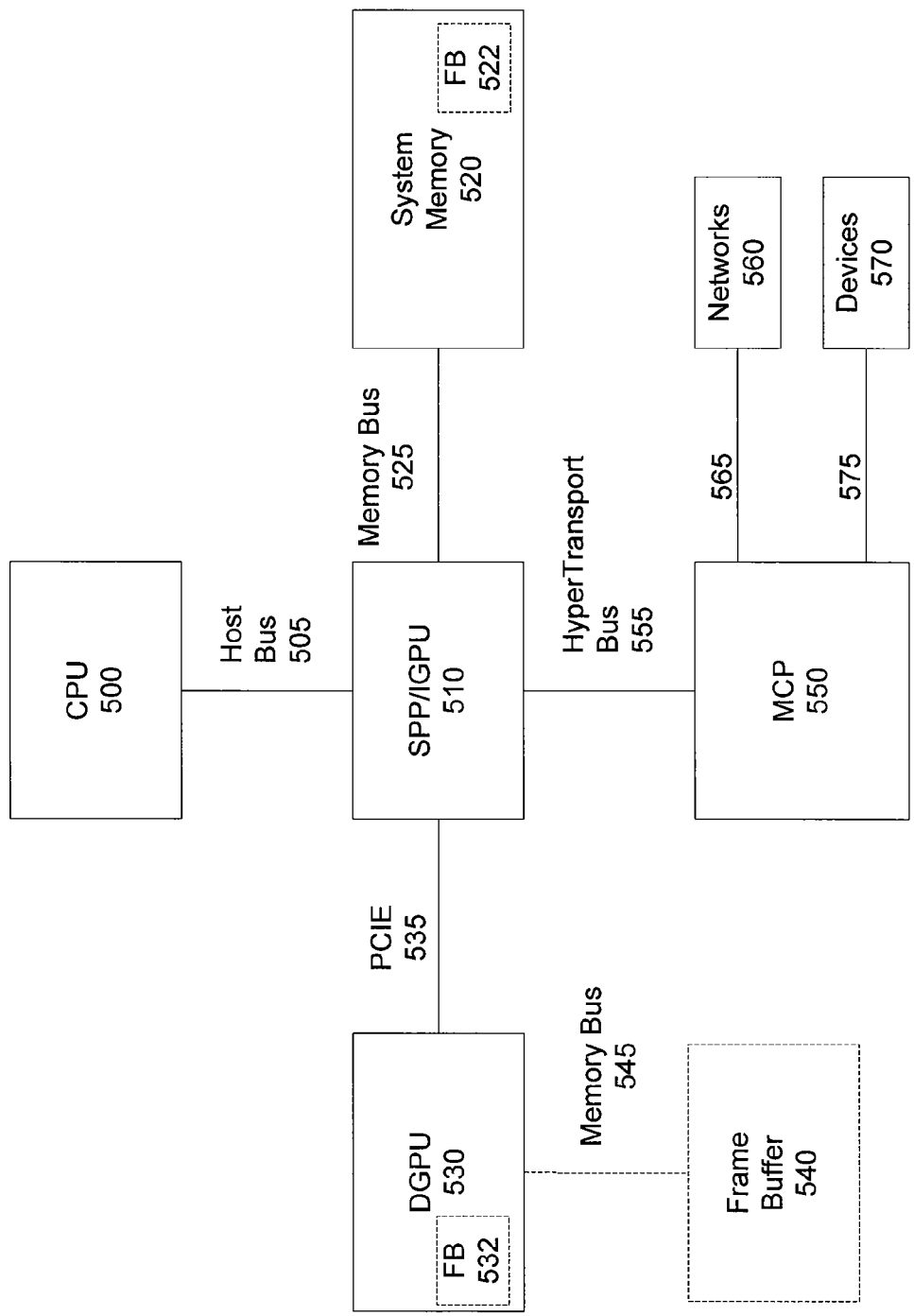
FIG. 5 is a block diagram of a computing system having heterogeneous GPUs that is improved by incorporating an embodiment of the present invention.

FIG. 5 is a block diagram of a computing system having heterogeneous GPUs that is improved by incorporating an embodiment of the present invention. This block diagram includes a central processing unit (CPU) or host processor 500, system platform processor (SPP) 510, system memory 520, a discrete graphics processing unit (DGPU) 530, media communications processor (MCP) 550, networks 560, and internal and peripheral devices 570. DGPU is located on a graphics card, while the CPU 500, SPP 510, system memory 520, and MCP 550 may be located on a computer system motherboard.

In one embodiment, SPP 510 includes an IGPU, which may instead be included in MCP 550. An IGPU may also be a separate chip on the same motherboard as SPP 510 and MCP 550. IGPU 510 and MCP 550 are commonly referred to as a chipset. The memory 520 is often a number of dynamic random access memory devices arranged in a number of the dual in-line memory modules (DIMMs).

CPU 500 connects to IGPU 510 over the host bus 505. IGPU 510 is in communication with the DGPU over a PCIE (PCI express) bus 535. IGPU 510 reads and writes data to and from the system memory 520 over the memory bus 525. The MCP 550 communicates with the IGPU 510 via a high-speed connection such as a HyperTransport bus 555, and connects network 560 and internal and peripheral devices 570 to the remainder of the computer system. DGPU receives data over the PCIE bus 535 and generates graphic and video images for display over a monitor or other display device (not shown). IGPU 510 can also generate graphic and video images for display over a monitor.

A frame buffer, local, or graphics memory 540 is also included but shown by dashed lines. The dashed lines indicate that frame buffer 540 may be located as a separate off-chip memory from DGPU 530, an on-chip memory 532, and/or part of a system memory as frame buffer 522. On-chip memory 532 may be referred to as a buffered fast response RAM or BFR. In one embodiment, following system power-up or reset, the DGPU initially renders comparatively low-resolution images to the BFR 532 for display. Afterward, the GPU renders images, which are typically higher resolution, and stores them in a system memory, e.g. in frame buffer 522. BFR 532, which is no longer needed for image storage, instead stores address information, referred to as page tables, identifying the location of data stored by the DGPU in the system memory, as described in embodiments of U.S. patent application Ser. No. 11/253,438.

Typically, a DGPU will render image frames faster than an IGPU. In one embodiment, a DGPU may render an image 4 times faster than an IGPU. Thus, when parallel rendering with the DGPU and the IGPU is attempted, problems with efficiency may ensue, e.g., the DGPU may be idle for significant amounts of time. In fact, the performance may even be slower than the DGPU executing by itself.

For example, to perform alternate frame rendering in a given cycle, a DGPU would need to render a four images while the IGPU would need to render the fifth image, with a similar sequence following for other cycles. This high number of images to be rendered in parallel can be costly as many images need to be buffered and can cause latency problems for user response. Also, the IGPU may need information from previous frames, and thus it may take significant time before rendering the fifth image can even begin, causing the DGPU to sit idle while waiting for the IGPU to finish.

For performing split frame rendering, the partition of an image into equivalent workloads may be difficult. Based on the example above, the DGPU would get roughly 80% of an image and the IGPU would get roughly 20%. However, that 20% of the image may include a lot of complexity and thus the relative workload may vary drastically from one image to another. Thus, heterogeneous GPUs prove difficult to efficiently perform distributed rendering. Another issue is that the iGPU must perform all the geometry calculations in order to figure out if it is responsible for the corresponding raster work. Since SFR only scales pixel work, a weak iGPU could completely limit the performance of the system if it is too slow at processing geometry. To this end, embodiments of the present invention provide efficient distribution of a rendering workload to two or more heterogeneous GPUs. Embodiments may be useful for homogeneous GPUs as well, e.g., when for SFR it is hard to find partitions of a frame that take equal times to render.

V. Split Command Buffer Rendering

To overcome the limitations of AFR and SFR, embodiments of the present invention switch execution of the commands for a frame from one GPU to another GPU at changing points within the command buffer. Splitting the workload of rendering an image based on the commands in a command buffer provides greater efficiency than a distribution that is based solely on the images themselves. Particularly when it is known that one GPU is slower than another one, the switching may take place an optimal position within the command buffer.

Figure 6:
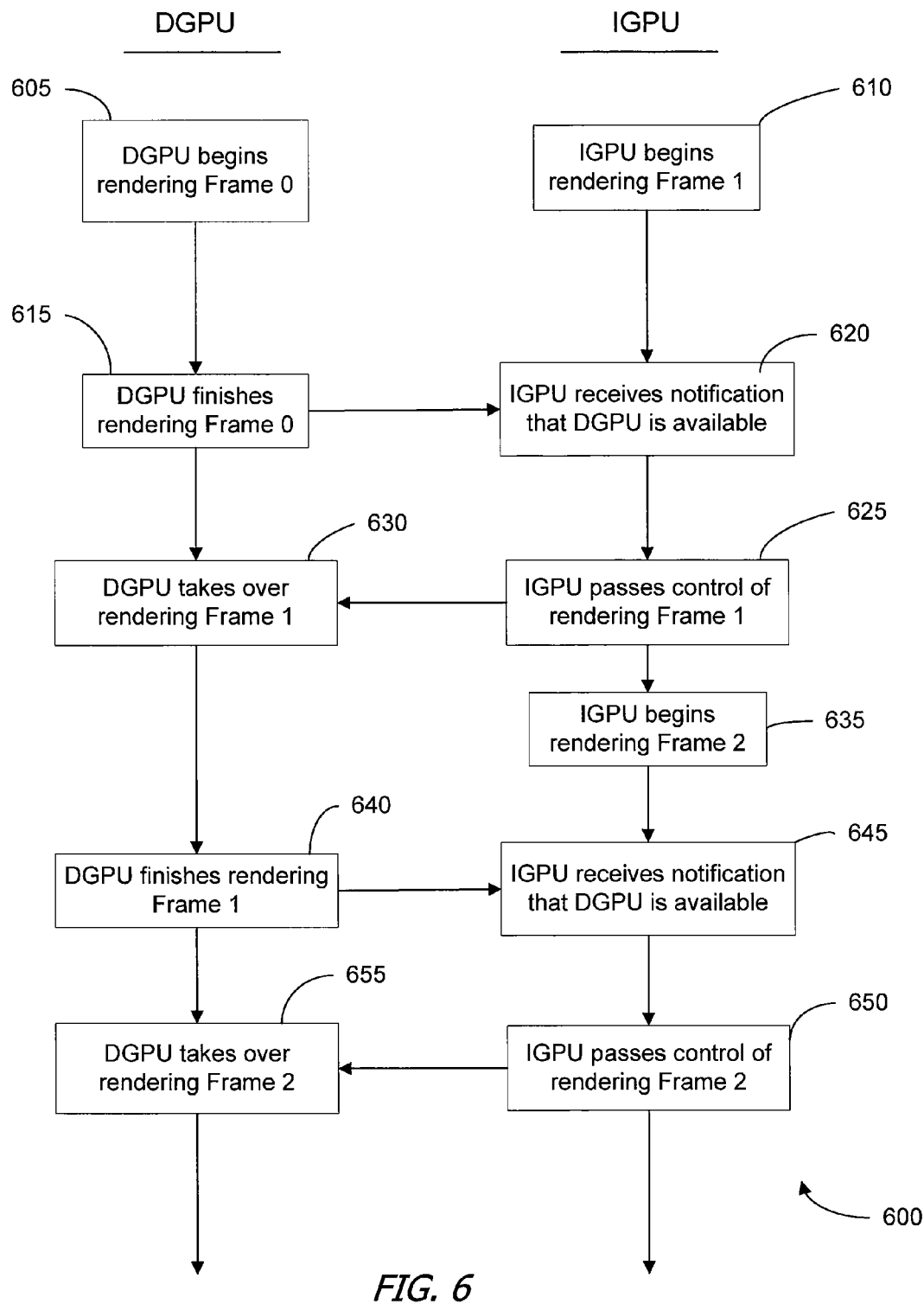
FIG. 6 illustrates a method of rendering a plurality of frames with a plurality of graphics processors configured to operate in parallel according to an embodiment of the present invention.

FIG. 6 illustrates a method 600 of rendering a plurality of frames with a plurality of graphics processors configured to operate in parallel according to an embodiment of the present invention. In one embodiment, the GPUs are heterogeneous. In another embodiment, there are two GPUs. In the example of FIG. 6, there are two heterogeneous GPUs, one a IGPU, and one a DGPU that is presumed to be faster than the IGPU. FIG. 6 shows steps performed by the DGPU and the IGPU, as well as interactions or transfers of control for rendering commands associated with a specific frame.

In step 605, the DGPU begins rendering frame 0. In one embodiment, this rendering of frame 0 starts from the beginning of the commands for frame 0, e.g., at the beginning of a first command buffer. In step 610, IGPU begins rendering frame 1. At least part of this rendering of frame 1 occurs while the DGPU is rendering frame 0.

In step 615, the DGPU finishes rendering frame 0. In step 620, the IGPU receives notification that the DGPU is available. The determination of availability may be made by the DGPU, a CPU, or another processor in the system. In one aspect, DGPU communicates directly to the IGPU that it has finished rendering the previous frame, i.e. frame 0. In step 625, the IGPU passes control for rendering its current frame (frame 1) to the DGPU. In one embodiment, this is done by passing a "get" pointer from the IGPU to the DGPU. In another embodiment, it could also be done by estimating how the work load would be split and letting each GPU finish its estimated portion. The portions sizes could be adjusted to achieve a good balance.

In step 630, the DGPU takes over rendering frame 1. In one embodiment, DGPU begins rendering frame 1 at a command that occurs immediately after the last command that the IGPU had executed. In another embodiment, the DGPU takes over rendering frame 1 at a convenient location in the command buffer that occurs before the last command that IGPU had executed. For example, the convenient location may be any one of a number of predetermined locations containing all of the state data required for rendering from that location forward, as is described later. In yet another embodiment, the IGPU and the DGPU both process all state commands, but only process graphics operations for their respective parts of the command buffer.

In step 635, the IGPU begins rendering a subsequent frame (frame 2) after it has passed control of rendering its current frame (frame 1) to the DGPU. Thus, the DGPU is rendering frame 1 in parallel with the IGPU rendering frame 2. In step 640, the DGPU finishes rendering frame 1. In step 645, the IGPU receives notification that the DGPU is available to render frame 2. In step 650, the IGPU passes control for rendering frame 2 to the DGPU. In step 655, the DGPU takes over rendering frame 2. This process may continue for additional frames. In the very unlikely event that the IGPU would finish rendering a frame before the DGPU is available, the IGPU can move on to start rendering the subsequent frame, or wait for the DGPU to finish the previous frame.

Figure 7:
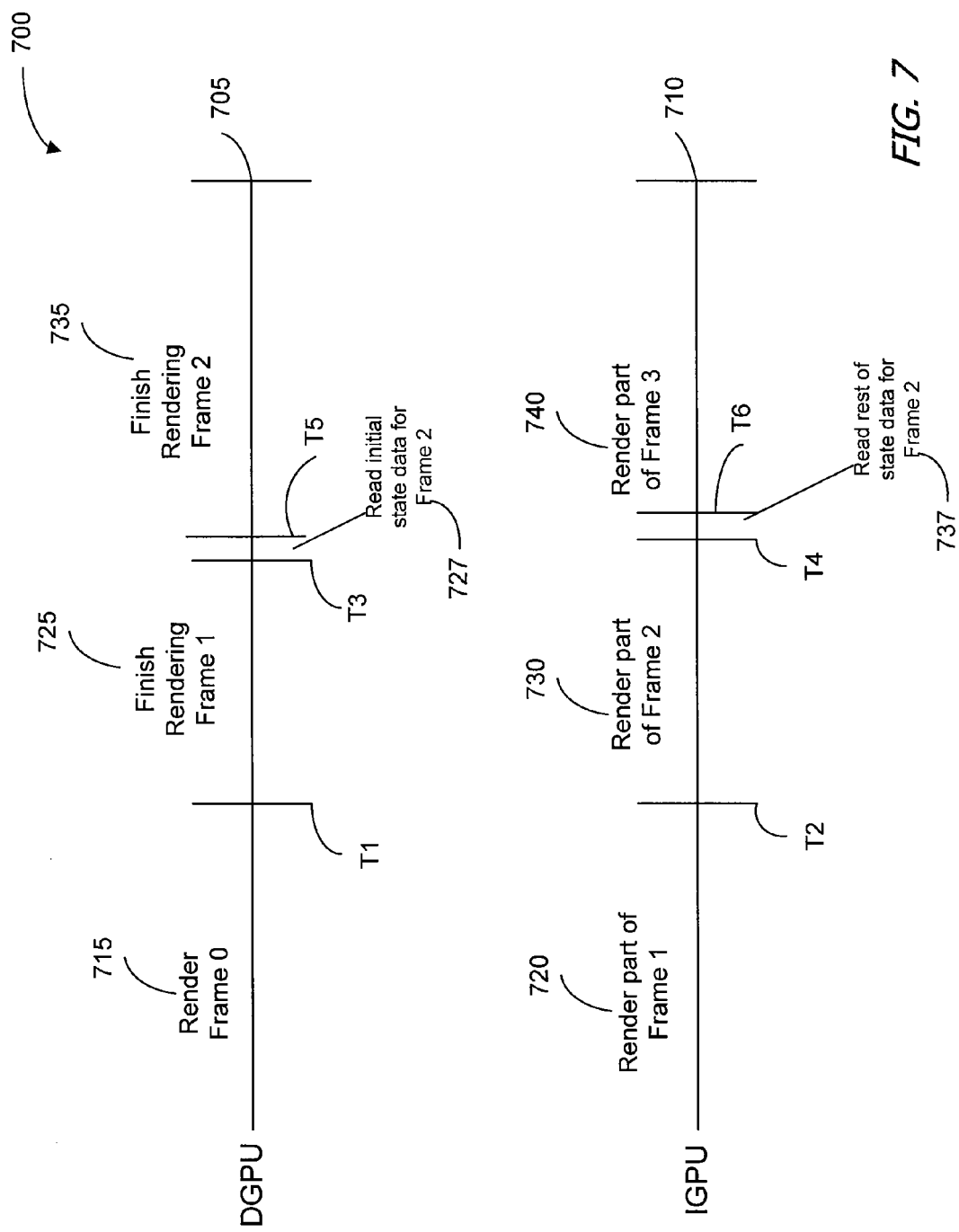
FIG. 7 is a timing diagram illustrating the rendering of multiple frames by an IGPU and a DGPU according to an embodiment of the present invention.

FIG. 7 is a timing diagram 700 illustrating the rendering of multiple frames by an IGPU and a DGPU according to an embodiment of the present invention. Time line 705 shows the workload being performed by the DGPU during different times. Time line 710 shows the workload being performed by the IGPU during different times. During a time period 715, the DGPU render frame 0. Concurrently, during a time period 720, the IGPU renders part of frame 1.

At a time T1, the DGPU finishes rendering frame 0. Based on the DGPU finishing rendering frame 0, the IGPU changes from executing commands for its current frame (frame 1) to executing commands for the subsequent frame (frame 2) during time period 730. After finishing rendering frame 0, the DGPU then finishes rendering frame 1 during time period 725. Thus, there is a switching of an execution of commands for frame 1 from the IGPU to the DGPU based on the DGPU completing the rendering frame 0. In another embodiment, DGPU may remain idle until the IGPU reaches time T2. Thus, rendering would start with frame 1. In this embodiment, T2 may be determined by a specific percentage, e.g. 20%, of commands for frame 1 being executed by the IGPU. Thus, in one embodiment, the finishing of one frame and beginning rendering another frame happen sequentially.

In another embodiment, at a time T3, the DGPU finishes rendering frame 1. Then DGPU begins reading (processing) state data for frame 2 during time period 727. After the DGPU reads sufficient state data (T5), it then finishes rendering frame 2 during the time period 735. Based on the DGPU reading state data to match the position of the IGPU, the IGPU changes from executing commands for its current frame (frame 2) to only reading state data from frame 2 during time period 737. After finishing processing only the rest of the state data (T6), the IGPU begins executing all commands for the subsequent frame (frame 3) during time period 740. In this manner, even though the time periods for rendering different frames may vary, neither the DGPU nor the IGPU are waiting for significant time periods for the other processor to complete the rendering of a frame.

In one embodiment, the time that the IGPU changes rendering a current frame to a subsequent frame may occur immediately after the DGPU finishes rendering a previous frame. In another embodiment, there may be some lag time for the IGPU to change frames it is rendering, and thus the DGPU may also be slightly delayed in starting to render the current frame. In yet another embodiment, a pre-indication of the DGPU being available soon may be sent to the IGPU, and thus the IGPU may change rendering frames prior to the DGPU finishing rendering a previous frame. Regardless of when the switch happens, the switching is based on the DGPU finishing rendering a previous frame whether the switch is just before, simultaneous, or just after the DGPU finishing rendering a previous frame.

Figure 8A:
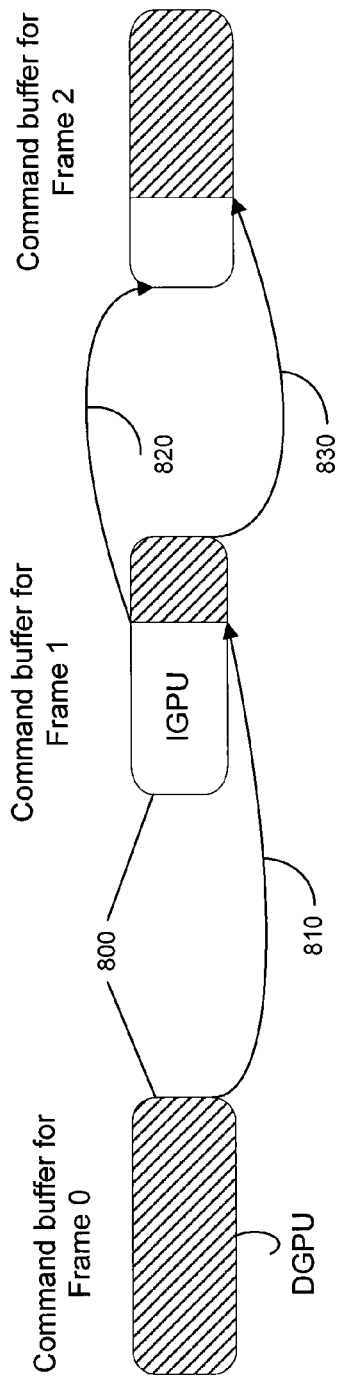
FIG. 8A illustrates the distribution of the rendering workload among command buffers for multiple frames using two GPUs according to one embodiment of the present invention.

FIG. 8A illustrates the distribution of the rendering workload among command buffers for multiple frames using two GPUs according to one embodiment of the present invention. Each command buffer 800 contains commands for one frame. The command buffer for frame 0 is completely executed by the DGPU, as signified with diagonal lines. The command buffer for frame 1 shows part of it executed by the IGPU, as signified with a solid background, and part of it executed by the DGPU, again signified with diagonal lines.

A command arrow 810 shows that once the DGPU finishes rendering frame 0 that it takes over the rendering of frame 1 from the IGPU. Command arrow 820 signifies that the IGPU then begins rendering frame 2. Command arrow 830 signifies that once the DGPU finishes rendering frame 1 that it again takes over rendering of the frame that the IGPU is currently rendering, in this case frame 2. Note that the size of the respective areas for the IGPU and the DGPU varies between frame 1 and frame 2.

Figure 8B:
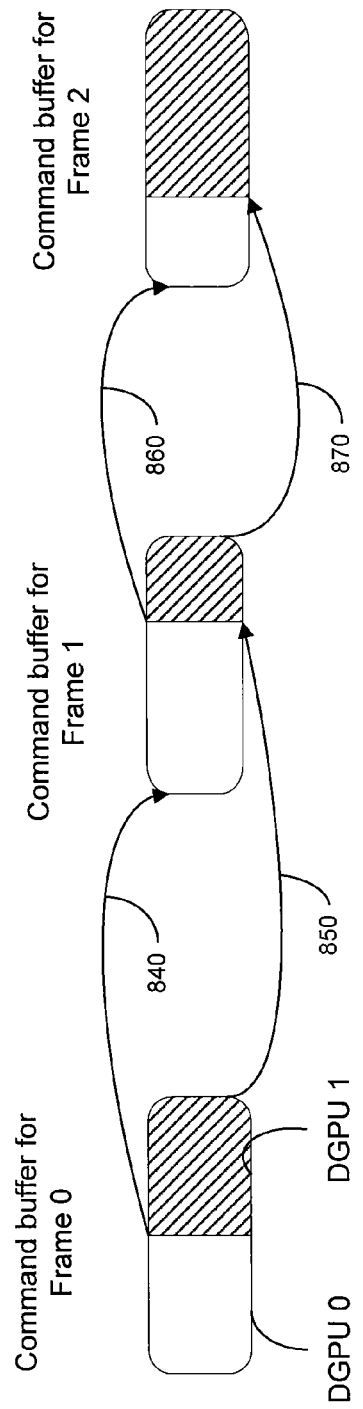
FIG. 8B illustrates the distribution of the rendering workload among command buffers for multiple frames using two GPUs according to another embodiment of the present invention.

FIG. 8B illustrates the distribution of the rendering workload among command buffers for multiple frames using two GPUs according to another embodiment of the present invention. This embodiment uses two DGPUs, which may be heterogeneous. The command buffer for frame 0 is partly rendered by both DGPU 0 and DGPU 1. In this embodiment, DGPU 0 renders roughly the first half of the command buffer for frame 0. This method of partitioning may also be done for an IGPU and a DGPU combination.

A command arrow 840 shows that once the DGPU 0 reaches a designated point of the command buffer of frame 0 that it switches to rendering frame 1. A command arrow 850 shows that once DGPU 1 finishes rendering frame 0 that it takes over the rendering of frame 1 from DGPU 0, and similarly for command arrows 860 and 870.

Figure 9:
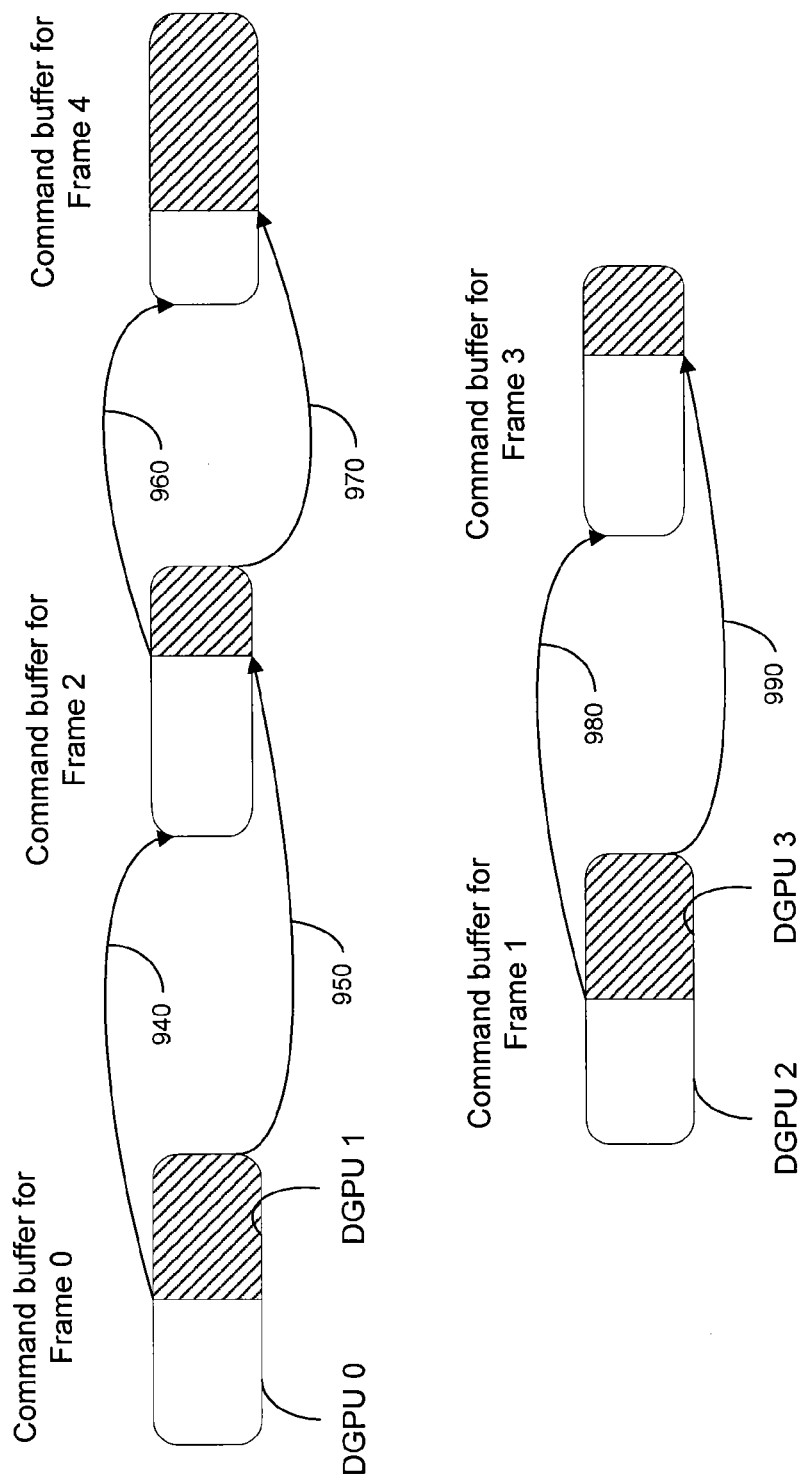
FIG. 9 illustrates the distribution of the rendering workload among command buffers for multiple frames using four GPUs according to an embodiment of the present invention.

In one embodiment, where there are more than two DGPUs, a combination of AFR and split command buffer rendering may be implemented. FIG. 9 illustrates the distribution of the rendering workload among command buffers for multiple frames using four GPUs according to an embodiment of the present invention. In a similar fashion to FIG. 8B, DGPU 0 and DGPU 1 split the execution of command buffers; however, they now split command buffers for frames 0, 2, and 4, and other even numbered additional frames. Command arrows 940-970 signify the switches in the execution of the command buffers.

As to the odd numbered frames, a command buffer for frame 1 is split between a DGPU 2 and DGPU 3. Once DGPU 2 reaches a designated point while rendering frame 1, then DGPU 2 begins rendering frame 3, as signified by command arrow 980. Once DGPU 3 finishes rendering frame 1, it takes over rendering frame 3 from DGPU 2, as signified by command arrow 990. In one embodiment, DGPU 0 and DGPU 2 are the same type of processor, which is slower than DGPU 1 and DGPU 3, which are both a type of a second processor.

As the control of executing commands of a frame switches, the new GPU may need to be aware of the current state of a switch and/or any state changes that occur before the switch. Thus, in one embodiment, the DGPU reads all of the information in the command buffer including commands and data that occur before the location that the IGPU stopped rendering the current frame, but the DGPU does draws nothing until it reaches the hand-off point. Similarly, the IGPU may scan the entire command buffer following the hand-off point in order to correctly track state information up to the beginning of the next frame, which it is moving to start rendering.

In another embodiment, the DGPU only reads the data information. However, this time for reading the commands and/or the data appearing before the switch may consume a lot of time. Accordingly, embodiments of the present invention save complete state data (i.e. all of the state data required for rendering from that point forward) at periodic handoff locations.

Figure 10A:
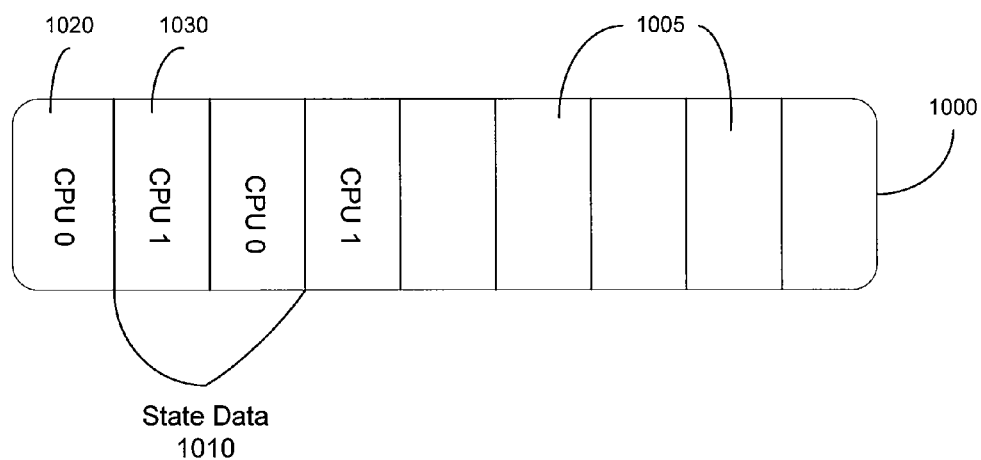
FIG. 10A illustrates a construction of a command buffer according to an embodiment of the present invention.

FIG. 10A illustrates a construction of a command buffer 1000 according to an embodiment of the present invention. Command buffer 1000 includes multiple instances of complete state data 1010, each stored at different locations (e.g., the beginning or end of a section 1005) within command buffer 1000. In one embodiment, state data 1010 is stored at periodic locations. State data 1010 includes information necessary to render the frame from that point forward. Thus, a GPU that takes over execution of a command buffer does not need to read the command buffer from the beginning, but can read the state data 1010 that occurs just prior to the location of the switch.

In embodiments, where more than one CPU writes commands to command buffer 1000, different CPUs may write to different sections of command buffer 1000. For example, the commands of a section 1020 may be written by CPU 0. At a section break area, CPU 0 writes data that encapsulates the present state. The commands of the next section 1030 may be written by CPU 1, which writes the current state data in a defined section break area. At least parts of section 1020 and 1030 may be written in parallel with each other. In this manner, command buffer 1000 may be written more quickly.

Figure 10B:
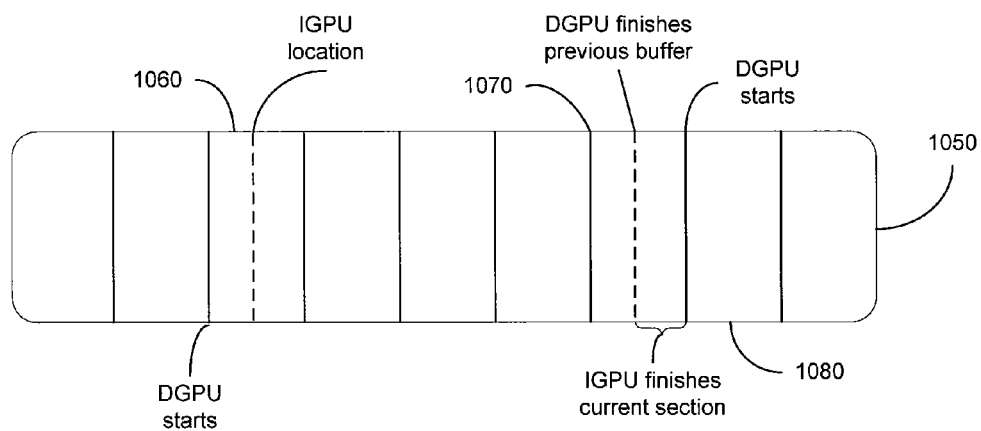
FIG. 10B illustrates locations within a command buffer for switching execution between GPUs according to an embodiment of the present invention.

FIG. 10B illustrates locations within a command buffer 1050 for switching execution between GPUs according to an embodiment of the present invention. In an embodiment, IGPU has executes only part of the commands for a section, e.g., section 1060, when it is determined that the DGPU is available. The progress of the IGPU in the command buffer is marked as the IGPU location. The DGPU may begin rendering command buffer 1050 at the beginning of section 1060, e.g., by first reading state data, which may be at the beginning of that section. If by chance, the IGPU location is at the end or beginning of a section, then the DGPU may start at approximately at the same location that the IGPU stopped rendering.

In another embodiment, the DGPU also finishes rendering a command buffer for a previous frame when the IGPU has executed only part of the commands for a section, e.g., section 1070, of the current command buffer 1050. The IGPU is allowed to finish rendering the current section 1070. The DGPU then starts to render command buffer 1050 at the beginning of the next section 1080, e.g., by reading the state data stored at the beginning of section 1080 or a section break area between section 1080 and the previous section.

Embodiments of the present invention can be implemented in the form of control logic in software or hardware or a combination of both. For example, the control logic may be stored in an information storage medium as a plurality of instructions adapted to direct an information processing device to perform a set of steps disclosed in embodiment of the present invention, or may be stored in a computer program product including a computer readable medium encoded with program code for controlling operation of a computer system.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of rendering pixels for a plurality of frames with a plurality of graphics processors configured to operate in parallel, the method comprising:
   providing, with a command buffer, commands for rendering pixels for a plurality of current frames; and
   for each current frame:
      rendering a first portion of a plurality of pixels for the current frame with a first graphics processor by providing, with the command buffer, a first portion of the commands for rendering the plurality of pixels for the current frame to the first graphics processor, and executing, with the first graphics processor, the first portion of the commands for rendering the plurality of pixels for the current frame;
      after a second graphics processor completes a rendering of a previous frame, rendering a second portion of the plurality of pixels for the current frame with the second graphics processor by providing, with the command buffer, a remaining portion of the commands for rendering the plurality of pixels for the current frame to the second graphics processor, and executing, with the second graphics processor, the remaining portion of the commands for rendering the plurality of pixels for the current frame; and
      rendering, with the first graphics processor, a first portion of a plurality of pixels for a subsequent frame while the second graphics processor completes rendering the second portion of the plurality of pixels for the current frame.

2. The method of claim 1 wherein providing the remaining portion of the commands for rendering the plurality of pixels for the current frame to the second graphics processor is also based on the second graphics processor finishing reading a portion of state data of the current frame.

3. The method of claim 1, further comprising:
   reading, with the first graphics processor, a remaining portion of state data before executing a first portion of the commands for rendering a subsequent frame.

4. The method of claim 1 wherein the first graphics processor is an integrated graphics processor and the second graphics processor is a discrete graphics processor.

5. The method of claim 1, further comprising storing the rendered current frames in a memory, wherein the memory is a system memory of a computer system that includes the first and second graphics processors.

6. The method of claim 1, further comprising:
   reading, with the second graphics processor, state data stored prior to the commands of the current frame last executed by the first graphics processor before the first graphics processor switches to executing commands for the subsequent frame.

7. The method of claim 6, further comprising:
   creating the command buffers, the creating including storing different instances of complete state data at a plurality of locations within the commands of each current frame; and
   wherein the read state data is one of different instances of complete state data that are stored at periodic locations within the command buffers.

8. The method of claim 1 wherein at least two of the graphics processors are heterogeneous to each other and operate to produce identical results upon executing identical commands.

9. The method of claim 1 wherein the second graphics processor executes all of the commands for the previous frame of a first current frame.

10. The method of claim 1 wherein the current frames comprise alternate frames of a video stream, further comprising rendering other current frames with other graphics processors, wherein the other current frames comprise different alternate frames of a video stream.

11. The method of claim 1 wherein different sections of the commands for rendering a specific current frame are written by different central processors.

12. The method of claim 1 wherein the first graphics processor renders a first plurality of lines in the current frame, and the second graphics processor renders a second plurality of lines in the current frame.

13. The method of claim 1 wherein the second graphics processor provides a signal to the first graphics processor indicating the availability of the second graphics processor.

14. A computer program product comprising a non-transitory computer readable medium encoded with program code for controlling operation of a computer system to render a plurality of frames with a plurality of graphics processors configured to operate in parallel, the program code including:
   program code for generating pixels by providing commands for rendering a plurality of current frames with a command buffer; and
   for each current frame:
      program code for rendering a first portion of a plurality of pixels for the current frame with a first graphics processor by providing, with the command buffer, a first portion of commands for rendering the plurality of pixels for the current frame to the first graphics processor, and executing, with the first graphics processor, the first portion of the commands for rendering the plurality of pixels for the current frame;
      program code for rendering a second portion of the plurality of pixels for the current frame with a second graphics processor by for providing, with the command buffer and after the second graphics processor has completed rendering a previous frame, a remainder of the commands for rendering the plurality of pixels for the current frame to the second graphics processor, and executing, with the second graphics processor, the remaining portion of the commands for rendering the plurality of pixels for the current frame; and program code for rendering executing, with the first graphics processor, a first portion of a plurality of pixels for a subsequent frame while the second graphics processor completes rendering the second portion of the plurality of pixels for the current frame.

15. The computer program product of claim 14 wherein the program code further includes:

program code for reading, with the second graphics processor, an instance of complete state data stored immediately prior to the commands of the current frame last executed by the first graphics processor before the first graphics processor switched to executing commands for the subsequent frame.

16. The computer program product of claim 14 wherein the current frames comprise alternate frames of a video stream, wherein the program code further includes:

program code for rendering other current frames with other graphics processors, wherein the other current frames comprise different alternate frames of a video stream.

17. A method of rendering pixels for a plurality of frames with a plurality of graphics processors configured to operate in parallel, the method comprising:

providing, with a command buffer, commands for rendering a first plurality of pixels for a first frame and commands for rendering a second plurality of pixels for a second frame;

rendering, with a first graphics processor, a first portion of the first plurality of pixels by executing a first portion of the commands for rendering the first plurality of pixels for the first frame;

providing, with a second graphics processor, a signal to the first graphics processor indicating the availability of the second graphics processor; and after receiving the signal from a second graphics processor indicating the availability of the second graphics processor:

rendering, with the first graphics processor, a first portion of the second plurality of pixels by executing a first portion of the commands for rendering the second frame; and rendering, with the second graphics processor, a second portion of the first plurality of pixels by executing a remaining portion of the commands for rendering the first plurality of pixels for the first frame while the first graphics processor renders the first portion of the second plurality of pixels for the second frame.

18. The method of claim 17 wherein the signal is provided by the second graphics processor based on when the second graphics processor completes executing commands for a command buffer for a frame previous to the first frame.

19. The method of claim 17 wherein the signal is provided by the second graphics processor based on a pre-indication signal that determines that the second graphics processor will be available soon.

20. The method of claim 17, further comprising:

providing commands for rendering a third frame;

upon determining another availability of the second graphics processor:

executing, with the first graphics processor, a first portion of the commands for rendering the third frame; and executing, with the second graphics processor, a remaining portion of a second command buffer while the first graphics processor executes the first portion of the commands for rendering the third frame.

* * * * *